United States Patent [19]
Hanson

[11] Patent Number: 5,178,002
[45] Date of Patent: Jan. 12, 1993

[54] SPECTROSCOPY-BASED THRUST SENSOR FOR HIGH-SPEED GASEOUS FLOWS

[75] Inventor: Ronald K. Hanson, Cupertino, Calif.

[73] Assignee: The Board of Trustees of the Leland Stanford Jr. University, Stanford, Calif.

[21] Appl. No.: 780,670

[22] Filed: Oct. 18, 1991

[51] Int. Cl.⁵ ............................................ G01M 15/00
[52] U.S. Cl. ..................................... 73/117.4; 356/315
[58] Field of Search ........................... 73/117.4, 30.03; 356/311, 315

[56] References Cited

U.S. PATENT DOCUMENTS 3,852,741 12/1974 McDonald ..................... 73/117.4 X Primary Examiner—Jerry W. Myracle
Attorney, Agent, or Firm—Flehr, Hohbach, Test, Albritton & Herbert

[57] ABSTRACT

A system and method for non-intrusively obtaining the thrust value of combustion by-products of a jet engine is disclosed herein. The system includes laser elements for inducing absorption for use in determining the axial velocity and density of the jet flow stream and elements for calculating the thrust value therefrom.

18 Claims, 3 Drawing Sheets

SPECTROSCOPY-BASED THRUST SENSOR FOR HIGH-SPEED GASEOUS FLOWS

CONTRACT

This invention was made with United States Government support under NASA Contract No. 2NCC-547. As a result, the United States Government has certain rights in this invention.

FIELD OF THE INVENTION

This invention relates generally to jet propulsion apparatus, and more specifically, to an apparatus and method for determining the thrust associated with a high-speed stream of gases.

BACKGROUND OF THE INVENTION

In-flight jet engine thrust is of interest to atmospheric scientists as well as jet engineers. Accordingly, it is important to develop methods for accurately determining the thrust of a jet engine.

It is well known that both engine power and efficiency are proportional to the product of the thrust times flight velocity. In order to control power and obtain maximum efficiency from, for example, a supersonic jet, thrust can be controlled by variable convergent-divergent nozzles.

In an on-ground jet testing facility, thrust is commonly measured on a thrust stand. While this type of measurement is accurate, the measurement is not truly characteristic of an engine's performance in flight. Furthermore, thrust stand measurements do not give spatially resolved information on the exhaust gases.

Another method for measuring thrust includes adding tracers or particulates to the jet stream to monitor the velocity of the jet stream; this together with information on gas density can yield the thrust. This method is used in some ground-testing facilities, but is unacceptable in many cases. For example, tracers and particulates are often toxic. When used in testing facilities, particulates cause health risks to facility personnel. Furthermore, particles do not follow the flow of the jet stream accurately and therefore, measurements of velocity, and hence thrust are inaccurate.

Exit velocity is often measured using laser-Doppler anemometry (LDA) which requires the presence of particles. LDA, however, does not provide a method for determining gas density. Hence, LDA must be combined with an auxiliary measurement in order to infer mass flux. Therefore, jet engine thrust measurement apparatus typically have several measurement components requiring support systems and data handling systems for each component.

There is an emerging need for non-intrusive measurement of thrust of new hypersonic aircraft engines and mass flux into an engine. There is also a need for a system which utilizes a minimum number of components. Methods utilizing rugged, compact and economical laser sources are also needed.

OBJECTS AND SUMMARY OF THE INVENTION

In light of the aforementioned problems with the prior art, it is therefore a general object of the present invention to provide an apparatus and method for non-intrusively and accurately measuring the thrust of a jet engine.

It is still another object of the present invention to provide a single system which measures both exit velocity and gas density as the elements of a thrust measurement.

It is a further object of the present invention to avoid the use of tracers or particles in thrust detection.

It is yet another object of the present invention to enable reliable in-flight thrust measurements.

It is yet a further object of the present invention to obtain spatially resolved thrust measurements.

These and other objects are achieved by a system and method of the present invention for non-intrusively determining thrust of a jet combustor apparatus wherein combustible gas by-products are released into the ambient environment. The system enables measurements of both velocity and mass flow rate (which is a function of density of the combustion by-products) virtually simultaneously so that the thrust may, in turn, be calculated by multiplying the velocity and the mass flow rate. By directing light at the jet flow stream at a wavelength which produces an absorption spectrum in a combustion by-product of interest, two types of measurements are possible. First, the velocity of the jet flow may be determined according to calculations using the Doppler effect. Second, the density of the combustion by-product of interest (and hence the mass flow rate) may be determined according to calculations using the Beer-Lambert law and the ideal gas law.

Other objects and advantages of the invention will become apparent upon reading the following detailed description with reference to the drawings:

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

As described above, the primary flow field parameters of interest are mass density and velocity. Thrust is calculable from velocity and mass flow rate according to variations of the following relationships:

$$\text{Thrust} = \text{velocity} \times \text{mass flow rate},$$

and

Mass flow rate = velocity × density, therefore,

Thrust = velocity × velocity × density.

Techniques for monitoring velocity and density described below include utilizing absorption characteristics of the combustion by-product of interest. Absorption is effected by utilizing a laser beam source in a line-of-sight transmission measurement, or by utilizing laser-induced fluorescence, capable of providing both single-point and multi-point (2-d and 3-d) measurements.

The choice of whether to utilize line-of-sight absorption or laser-induced fluorescence is determined by the characteristics of the combustion by-product of interest. Where the absorption line spectrum of the combustion by-product is strong, laser-induced fluorescence can be utilized instead. In either case, the absorption is under observation.

Laser sources include tunable continuous wave (cw) lasers (ring dye lasers and semiconductor diode lasers) and tunable pulse lasers (excimer-pumped dye and narrow-line width excimer). Wavelength modulation and high-speed frequency modulation (FM) spectroscopy techniques are utilized to provide increased data recording rates. Furthermore, other flow field parameters which can be measured simultaneously with those of present interest include species concentrations, temperature and pressure.

Figure 1:
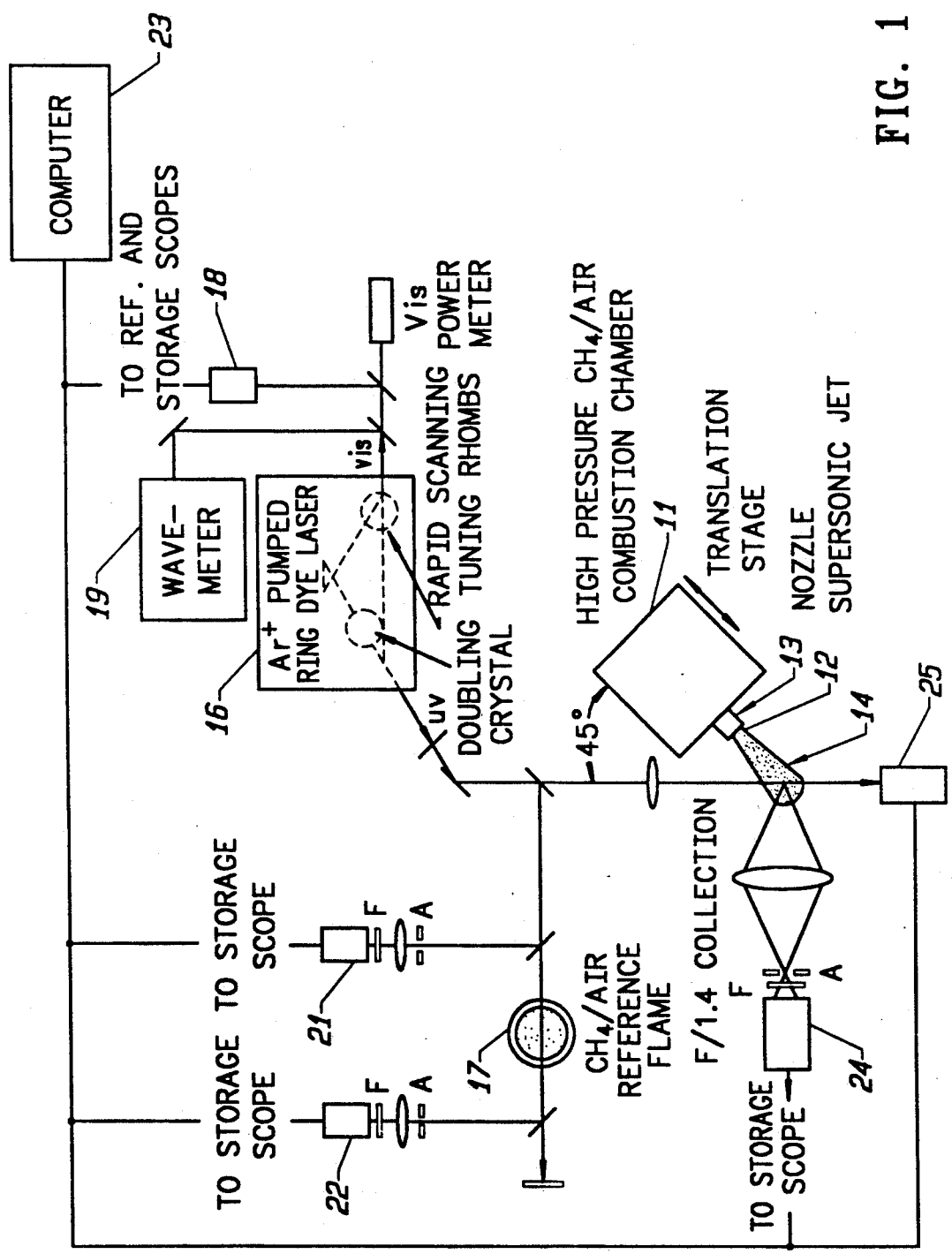
FIG. 1 is a schematic diagram of the components of a thrust detector of the present invention.

Turning now to the drawings, wherein like components are designated by like reference numerals in the figures, attention is initially directed to FIG. 1. A combustion chamber 11 is depicted therein having an exit end 12 at the nozzle's 13 distal end. A jet stream 14 exits the combustion chamber 11 at exit end 12. The combustion chamber 11 depicted therein can operate in flight or in an on-ground testing facility.

As stated above, thrust is the product of the axial velocity and the mass flow rate (which is the product of density and velocity) of the combustion by-products. In the present invention, the velocity and density of a species of combustion by-products of the jet stream 14 are measured by one system simultaneously.

Axial velocity measurement means as shown in FIG. 1, includes laser 16 with its laser beam 15 directed at the exit end 12. The laser 16 operates at a wavelength corresponding to the absorption spectrum of the combustion by-product of interest so that the laser light is absorbed producing absorption lines, such providing a Doppler shifted absorption signal. To resolve velocities, the Doppler effect is utilized wherein a non-Doppler-shifted reference is scanned concurrently with the Doppler shifted absorption signal. A non-Doppler shifted velocity reference frame is depicted as reference flame 17. The laser beam 15 is split so that a portion is directed to reference flame 17.

The laser beam 15, in FIG. 1, is incident at an angle, in this case, 45 degrees relative to the axis of the jet stream 14 flow. The cosine of the angle provides the axial velocity vector. A measurable Doppler shift in the spectral position of the absorption/fluorescence signal is compared to the reference flame 17 by computer 23. Any angle, however, which provides an axial component may be used. The known reference frame 17 has a directional component along the flow direction.

FIG. 1 shows a detector 21 which detects and records incident intensity, $I_o$, of the laser beam on the jet stream. Detector 22 detects and records resultant intensity, $I_{res}$, in order to calculate $\Delta I_{ref}$, such that $\Delta I_{ref} = I_o - I_{res}$. A reference frame to compare to the Doppler shifted absorption signal is therefore established and a reference frame output signal is sent to computer 23. The velocity reference frame output signal is received by computer 23, and is used as the stationary reference frame in the Doppler effect velocity calculation. It should also be noted that instead of an active reference frame, the reference frame may be provided by any appropriate static sample of the absorbing compound.

The absorption line spectrum of the jet stream is detected and recorded by detector 24 for fluorescence detection or detector 25 at the terminus of the beam for line-of-sight absorption measurements. The axial velocity is inferred from the shift in the spectral line position with respect to the stationary reference frame caused by the Doppler effect. A spectral feature monitored in a moving gas shifts from its known reference frame's 17 directional component along the flow direction. Measurement of this Doppler shift, $\Delta \nu$, and knowledge of the geometry allows the determination of the axial gas velocity v, where $$v = (\Delta \nu / \nu) c / \cos \theta$$

where c is the speed of light and $\theta$ is the angle between the beam and the flow direction.

Accurate Doppler-based velocity measurements depend on the use of absorption with a sufficiently large Doppler shift to total line width ratio. The spectral feature must also have a suitable absorption coefficient to ensure a large signal to noise ratio (SNR). Ideal absorptions are in the 20–80% range.

Density, and hence mass flow rate, is simultaneously calculated from a measurement of the transmitted fraction of the incident light, as a function of laser wavelength yielding a spectrally resolved record which can be analyzed via the Beer-Lambert law to infer the path-average density of the absorbing species (assuming the absorption coefficient is known).

FIG. 1 shows detector 21 which detects and records the incident intensity, $I_o$ and detector 24 or detector 25 for detecting and recording the absorption line spectra and therefore the transmitted intensity of the jet stream 14, $I_{trans}$. Computer 23 calculates the absorption intensity, according to $\Delta I_{abs} = I_o - I_{trans}$ for use calculations using Beer-Lambert's law.

Detector 18 receives wavelength and/or frequency input values from wavemeter 19 and sends the values to computer 23 for use in calculations. The Beer-Lambert law is as follows:

$$\Delta I_{abs}/I_o = 1 - \exp(-k_\nu P_{abs} L),$$

where $\Delta I_{abs}$ is the absorbed laser intensity, $I_o$ is the incident laser intensity, $k_\nu (\text{atm}^{-1} \text{cm}^{-1})$ is the absorption coefficient and $P_{abs}$ is the partial pressure (atm) of the absorbing species and L (cm) is the path length of absorption.

By knowledge of the partial pressure from the Beer-Lambert calculations, the total mixture pressure can be determined directly when the mole fraction of the absorbing species is known. The density ($\rho$) can then be calculated according to the ideal gas equation which yields, $$\rho = MP/RT.$$

where P is pressure, M is the molecular weight of the combustion by-products species, R is the universal gas constant and T is the temperature.

An alternative means of determining the mixture pressure P is from the width of the recorded spectral feature (i.e. the linewidth), since this width is proportional to pressure.

Therefore, the calculations of velocity and density (and hence mass flow rate) are performed virtually simultaneously using the same system for both calculations. Computer 23 receives the reference frame output signal and the absorption line output signal from detector 24 or detector 25 provides axial velocity comparison means according to the Doppler effect. Furthermore, computer 23 virtually simultaneously receives the absorption intensity output signal and the incident intensity reference output signal and provides density measurement means according to the Beer-Lambert law and the ideal gas law. Moreover, computer 23 generates the calculated density measurements and axial velocity measurements and multiplies their values to give a signal representing the mass flow rate, therefore providing mass flow rate means. Furthermore, computer 23, generates the axial velocity output signal and the mass flow rate output signal and multiplies their values to give a signal representing the sought after thrust value, therefore providing thrust means.

While fixed-frequency methods have the capability of determining the velocity, pressure and temperature, mass flow rate measurements are also obtainable using rapid-tuning laser absorption. Rapid-tuning provides the capability of fully resolving, at kilohertz rates, the frequency variation of a given absorption feature. Data, which may be in the form of fractional absorption of the laser beam, are recorded continuously as the laser repetitively sweeps in frequency. The variation of the laser frequency in time is simultaneously measured in order to convert the data's time base to a frequency scale. Once this is accomplished, the recorded absorption feature may be analyzed to infer temperature and pressure (which are used to infer mass density, as discussed below). Frequency modulation can be effected in some solid state lasers sources as well as ring dye lasers. Solid state lasers have the added advantages of economy, ruggedness and compactness for use in process control and flight instrumentation.

Furthermore, wavelength modulation can also be used. By rapid scanning of a laser across a spectral region encompassing two absorption lines of a species, a time-dependent signal which contains complete absorption line profiles of both transitions is generated. Temperature can be inferred from the ratio of the line intensities, pressures from the line width, density and velocity from the Doppler shift of the lines relative to those of a static sample. Density measurement means can also include calculations made from the total absorption if the temperature is known. In cases where the mole fraction of the species is either known or can be modeled, these can be converted to total density. Density can also be determined using the broadening of the line shape if this effect is large. Accordingly, using frequency modulation or wavelength modulation, the mass flow rate, and hence thrust, is determined from the product of the mass density signal output and the velocity output signal.

While stationary samples such as reference flame 17 depicted in FIG. 1 are convenient reference sources, line center frequency is affected by pressure as well, and an unwanted non-Doppler component may contribute to the total relative frequency-shift if the sample and the reference volumes are at different pressures.

Figure 2:
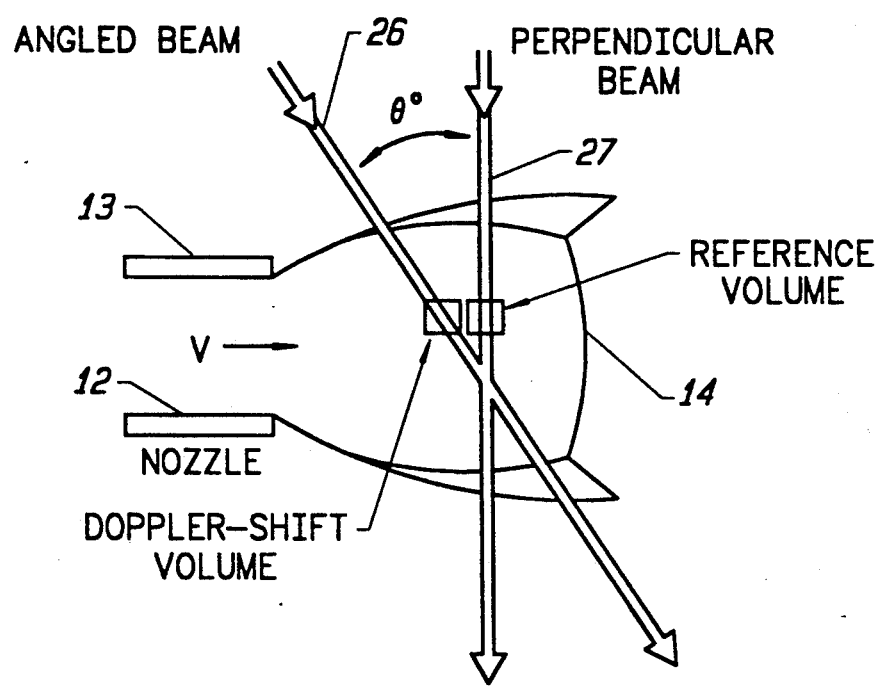
FIG. 2 is a schematic diagram of a cross beam configuration of the present invention using laser induced fluorescence.

An alternative is to utilize the flowing gas itself as the non-Doppler-shifted reference. This strategy, depicted in FIG. 2, employs two laser-induced fluorescence (LIF) beams: a first beam 26 passes obliquely and the second beam 27 perpendicular to the flow direction. Accordingly, detection of absorption which ultimately produces fluorescence allows spatially resolved velocity measurements. Closely spacing the two volumes reduces errors, owed to differing pressure shifts, in the reported velocity. Monitoring the fractional absorption (not the emission of absorbed light) of the two transmitted beams of FIG. 2, for purposes of extracting velocity, temperature and pressure, becomes plausible when the flow is spatially uniform. Absorption signals collected from either (or both) the Doppler-shifted or reference volumes can be reduced from inferring temperature and pressure (and thus density) while velocity is obtained between the two recorded profiles.

Moreover, when flows are nonuniform or unknown, multiple beam imaging may be used to combine absorption measurements with tomographic analysis methods, especially in the case that low power lasers are used and optical fibers are employed to provide multiple beams utilizing multiple absorption paths at different angles without requiring large windows in the device being monitored.

Figure 3:
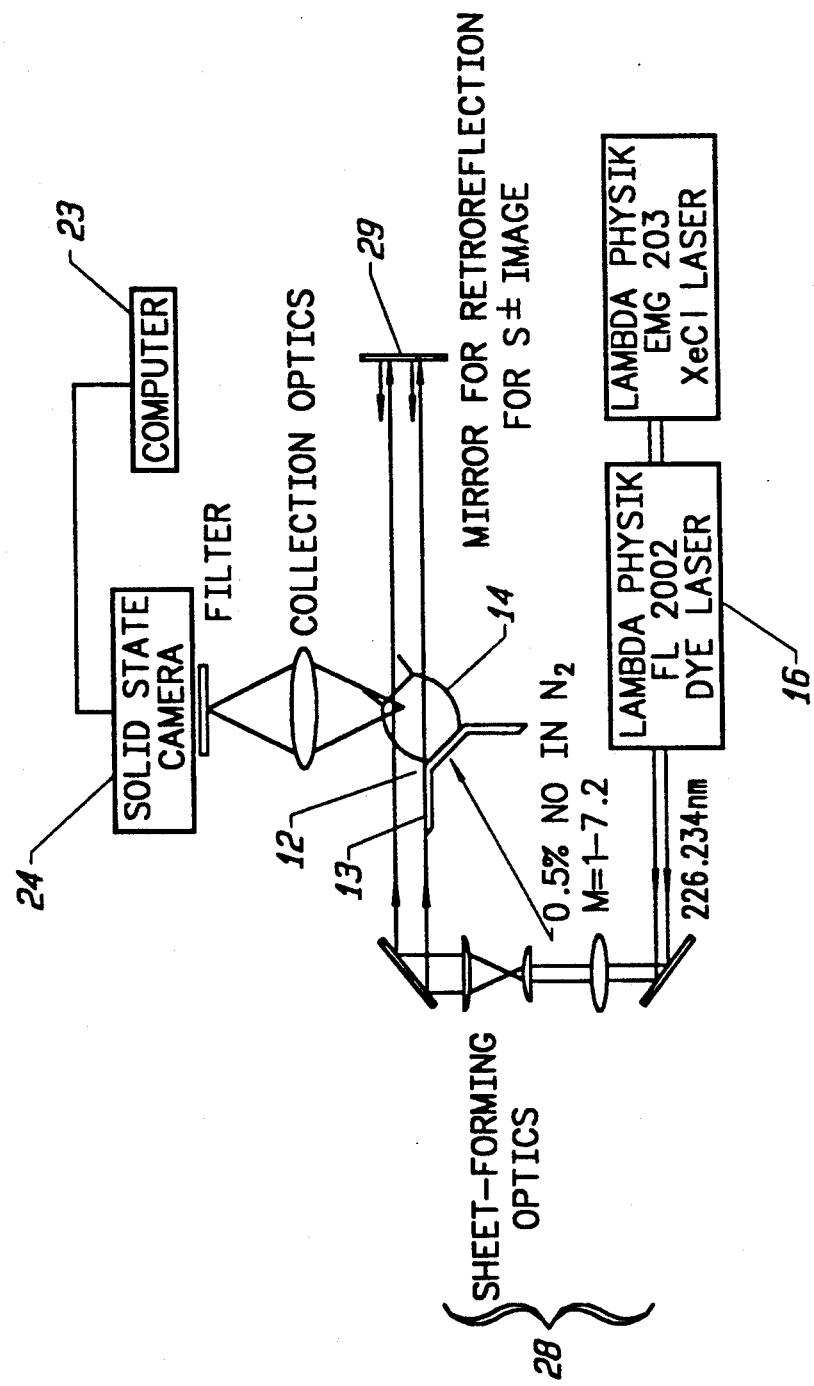
FIG. 3 is a schematic diagram of a planar laser induced fluorescence configuration of the present invention.

Also, planar laser-induced fluorescence (PLIF) measurement in which a large number of point LIF measurements in a planar region are recorded simultaneously on an intensified CCD array detector (not shown) may be used. FIG. 3 shows a schematic for velocity imaging by PLIF of a supersonic jet stream 14. Laser 16, which in this case is a dye laser, generates light which is transmitted through a series of sheet forming optics 28. A mirror 29 is provided for retroreflection to enable imaging of both forward and backwards-directed light sheets (S± beams). The image to be collected is transmitted through collection optics 31 and is received and recorded by a camera 24.

Recording information can be effected by a high-speed digital camera for recording instantaneous 3-d images and fast 2-d image "movies." The basic concept involves modifying a commercial image converter camera (for example, an Imacon 790) to incorporate CCD detection. In brief, a specially designed tapered fiberoptic bundle is used to transfer the output plane image of the converter camera onto a high-resolution (i.e., 400×1200 pixels), low-noise CCD array detector. This system is capable of recording a modest number of images at up to 10 million frames per second. Together with a high-energy, long-pulse dye laser source to provide "cw" flow field illumination, this camera allows rapid recording of multiple PLIF images, constituting either an instantaneous multiple-plane 3-d image data set or an multiple-image movie over a brief time interval (i.e., 2 microseconds for the current pulsed dye laser).

Combustion of jet fuel leads to a number of combustion by-products depending upon the fuel under combustion and the atmospheric parameters. For example, combustion requires intake of air, which in part is composed of molecular oxygen. Because the present invention is applicable to any combustion by-product, molecular oxygen in the jet flow stream may be monitored.

The decision to monitor one type by-product instead of another in conjunction with the present invention is dependent upon ease of spectrographic resolution. For example, absorption measurement of molecular oxygen is possible using either the Schumann-Runge band system (in the UV and VUV) or the A-band system near 760 nm. The emergence of new semiconductor laser sources, especially at the wavelengths which match the A-band absorption of oxygen near 760 nm, are ideal for this application. The absorption of oxygen at 760 nm is weak and therefore frequency modulation is used to enable the detection of the weak absorption at relatively rapid rates.

Tunable diode lasers offer the possibility of an economical, rugged and compact alternative to cw ring dye lasers for spectrally resolved absorption and fluorescence spectroscopy. At present, such lasers are available in several wavelength intervals at wavelengths generally in excess of 750 nm, but the trend toward operation at shorter wavelengths is clear. These lasers have significant potential advantages over ring dye lasers, including the possibility of high frequency modulation of laser wavelength through current modulation. Monitoring molecular oxygen, which is detected at 760 nm (the atmospheric band of oxygen) and water ($H_2O$) is detected near 1.35 microns, both by-products of combustion can be detected by these lasers and have great potential for fundamental research and for packaged, user-friendly instruments, including flight instrumentation.

As described above, the primary flow field parameters of interest are mass density and velocity. Techniques for monitoring velocity and mass flow rate include utilizing absorption effects producing line spectra and absorption prior to fluorescence. In light of the foregoing, it is clear that the general object of the present invention to provide an apparatus and method for non-intrusively and accurately measuring the thrust of a jet engine has been met. Moreover, the object of the present invention to provide a single apparatus which measures both exit velocity and gas density, virtually simultaneously, to obtain a thrust measurement has been met. Also, the object of the present invention to avoid the use of tracers or particles in thrust detection has been met as has the object to obtain reliable in-flight thrust measurements. Furthermore, the object to obtain spatially resolved thrust measurements has been met.

While the invention has been shown and described in what is presently conceived to be the most practical and preferred embodiment of the invention, it will become apparent to those of ordinary skill in the art that many modifications thereof may be within the scope of the invention, which scope is to be accorded the broadest interpretation of the claims so as to encompass all equivalent structures and devices.

I claim:

1. A system for non-intrusively determining the thrust of a jet combustor apparatus having an exit end wherein combustible gas by-products are released into the ambient environment, comprising:
   axial velocity measurement means for measuring the axial velocity of at least one species of said combustion by-products and generating an axial velocity output signal;
   mass flow rate measurement means for measuring the mass flow rate of said species of combustion by-products and generating a mass flow rate output signal;
   thrust calculation means for receiving said axial velocity output signal and said mass flow rate output signal and providing a signal representing said thrust.

2. A system as recited in claim 1 wherein said axial velocity measurement means and said mass flow rate measurement means provide measurements simultaneously.

3. A system as recited in claim 1 wherein said mass flow rate measurement means comprises:
   density measurement means for measuring the density of said species of combustion by-products and providing a density output signal;
   axial velocity measurement means for measuring the axial velocity of said species of combustion by-products and providing an axial velocity output signal; and
   mass flow rate means for receiving said density output signal and said axial velocity output signal and providing a signal representing said mass flow rate.

4. A system as recited in claim 3 wherein said axial velocity measurement means comprises:
   laser means operating at a wavelength corresponding to an absorption spectrum having absorption lines of said species of combustible gas by-products, said laser means for generating light directed at said exit end of said combustor such that at least some of said light is absorbed by said species of combustion by-products;
   absorption lines recording means for recording absorption line information and generating an absorption line output signal;
   velocity frame reference means for generating a reference frame output signal; and
   velocity comparison means for receiving said absorption line output signal and said reference frame output signal and providing a signal representing said axial velocity.

5. A system as recited in claim 4 wherein said laser means comprises an argon ion pumped ring dye laser.

6. A system as recited in claim 4 wherein said laser means comprises a semiconductor laser.

7. A system as recited in claim 4 wherein said velocity comparison means comprises means for calculating the Doppler shift of said absorption lines recorded by said absorption lines recording means with respect to said velocity reference frame means.

8. A system as recited in claim 3 wherein said axial velocity measurement means comprises:
   laser means in a cross beam configuration operating to induce fluorescence in the combustion by-products;
   means for monitoring two slightly separated volumes of said fluoresced combustion by-products and generating first and second output signals;
   wherein said first output signal is representative of a reference volume and wherein said second output signal is representative of a Doppler-shift volume; and
   velocity comparison means for receiving each of two said output signals and providing a signal representing said axial velocity.

9. A system as recited in claim 3 wherein said density measurement means comprises:
   laser means for generating light directed at said exit end of said combustor apparatus such that some of said light passes through said combustion by-products;

transmitted intensity measurement means for receiving and measuring the intensity of said light which passes through said combustion by-products and generating an transmitted intensity output signal;
incident intensity reference means for generating an incident intensity reference output signal; and
intensity comparison means for receiving said transmitted intensity output signal and said incident intensity reference output signal and providing a density output signal.

10. A system as recited in claim 9 wherein said intensity comparison means comprises the means for calculating the ratio of said intensity output signal and said intensity reference output signal.

11. A system as recited in claim 3 wherein said velocity reference frame means comprises a static gas sample.

12. A system as recited in claim 3 wherein said velocity reference frame means comprises a calibration technique of said velocity comparison means.

13. A system as recited in claim 3 wherein said signal representing said mass flow rate is the product of said density output signal and said axial velocity signal.

14. A system as recited in claim 1 wherein said signal representing said thrust is the product of said axial velocity output signal and said mass flow rate output signal.

15. A method for non-intrusively determining the thrust of a jet combustor apparatus having an exit end wherein combustible gas by-products are released into the ambient environment, comprising the steps of:
measuring the axial velocity of at least one species said combustion by-products and generating an axial velocity output signal;
measuring the mass flow rate of said species of combustion by-products and providing a mass flow rate output signal;
multiplying said axial velocity output signal with said mass flow rate output signal to provide a signal representing said thrust.

16. A method as recited in claim 15 wherein said mass flow rate measuring step comprises:
measuring the density of said species of combustion by-products and providing a density output signal;
measuring the axial velocity of said species of combustion by-products and providing an axial velocity output signal;
multiplying said density output signal with said axial velocity output signal to provide a signal representing said mass flow rate.

17. A method as recited in claim 16 wherein said axial velocity measuring step comprises:
operating a laser at a wavelength corresponding to an absorption spectrum having absorption lines of said species of combustible gas by-products;
generating light directed at said exit end of said combustor such that at least some of said light is absorbed by said species of combustion by-products;
recording absorption line information and generating an absorption line output signal;
generating a reference frame output signal; and
calculating the Doppler shift in said absorption lines with respect to said reference frame from said absorption line output signal and said reference frame output signal to provide a signal representing said axial velocity.

18. A method as recited in claim 16 wherein said density measuring step comprises:
operating a laser and generating light directed at said exit end of said combustor apparatus such that some of said light passes through said combustion by-products;
receiving and measuring the transmitted intensity of said light which passes through said combustion by-products and generating an intensity output signal;
generating an incident intensity reference output signal; and
calculating the ratio of said transmitted intensity output signal and said incident intensity reference output signal to provide a density output signal.

* * * * *